United States Patent [19]

Baldacci

[11] Patent Number: 5,017,759
[45] Date of Patent: May 21, 1991

[54] STEAM PRODUCING MACHINE WITH IMPROVED DELIVERY NOZZLE ESPECIALLY FOR HEATING BEVERAGES AND RISING FOAM THEREIN

[75] Inventor: Lapo Baldacci, Florence, Italy
[73] Assignee: Bimak S.p.A., Florence, Italy
[21] Appl. No.: 363,495
[22] Filed: Jun. 8, 1989
[30] Foreign Application Priority Data Jun. 17, 1988 [JP] Japan ................................ 3509 A/88

[51] Int. Cl.5 ............................................. H05B 3/28
[52] U.S. Cl. ..................................... 392/386; 392/396
[58] Field of Search ............................... 219/271–276, 219/362; 239/425.5, 335; 99/293, 323.1

[56] References Cited

U.S. PATENT DOCUMENTS

| | | | |
|---|---|---|---|
| 2,076,709 | 4/1937 | Deutsch | 219/271 |
| 2,561,443 | 7/1951 | March | 219/271 |
| 3,424,547 | 1/1969 | Winniett | 219/271 |
| 3,546,428 | 12/1970 | Omohundro | 219/271 |
| 3,648,932 | 3/1972 | Ewald | 239/425.5 |
| 4,502,371 | 3/1985 | DiLascio | 99/293 |
| 4,800,805 | 1/1989 | Mahlich | 99/293 |
| 4,827,904 | 5/1989 | Bonanno | 99/293 |

FOREIGN PATENT DOCUMENTS 14630  2/1912  United Kingdom ................ 239/335

Primary Examiner—Teresa J. Walberg
Attorney, Agent, or Firm—McGlew & Tuttle

[57] ABSTRACT

Steam producing machine with a delivery nozzle, especially for heating beverages and rising foam therein characterized in that it includes a water boiler with relevant sealing lid, to the bottom of which boiler a heating electrical resistance is combined and which is provided at its top with an outlet for the steam intercepted by a manually operated valve to which a delivery nozzle is fixed, which is made up of a first tubular element which, in the outlet part, has a second tubular element coaxially mounted therein having its ends communicating with the atmosphere.

4 Claims, 1 Drawing Sheet

U.S. Patent
May 21, 1991
5,017,759
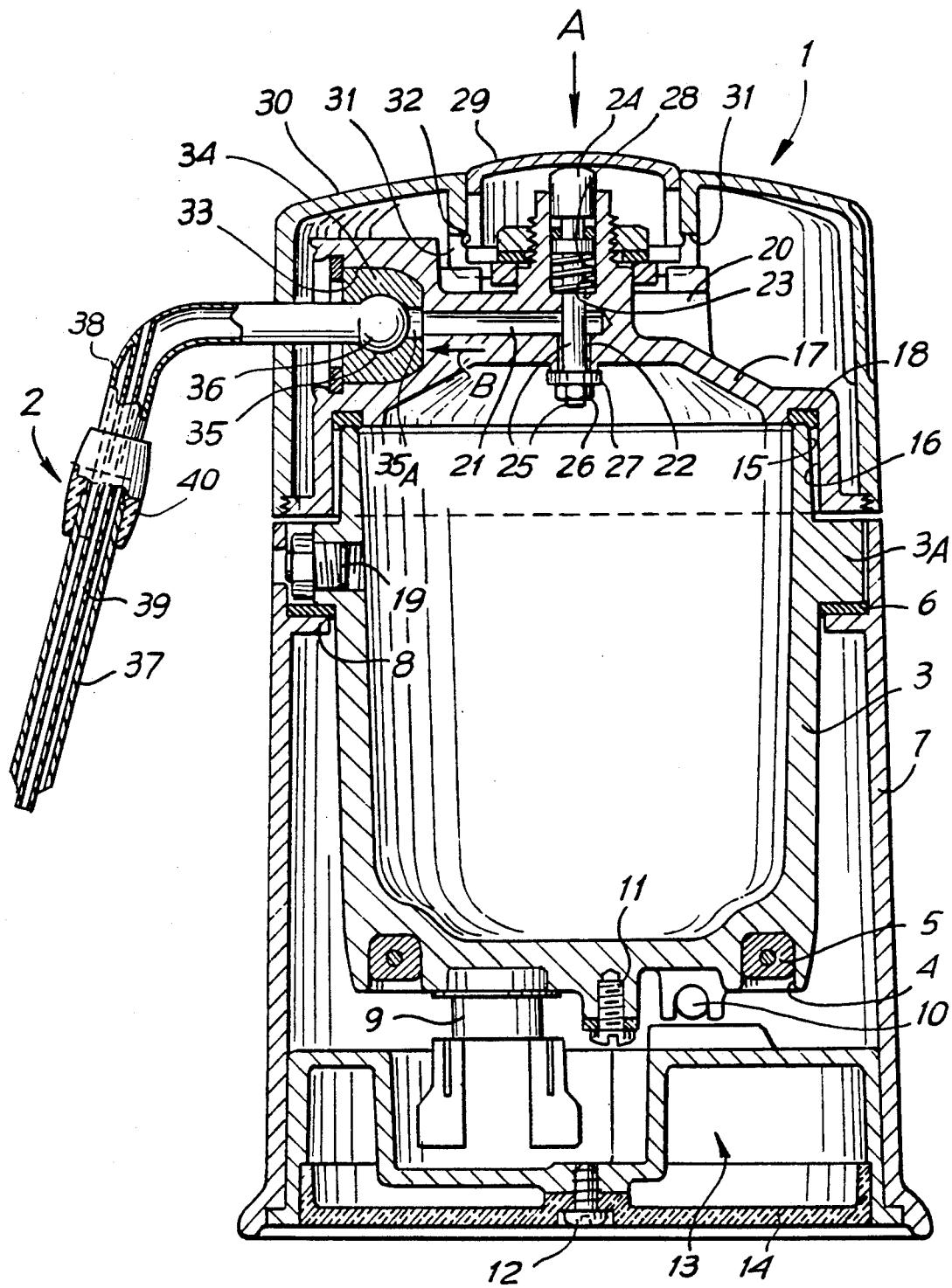

STEAM PRODUCING MACHINE WITH IMPROVED DELIVERY NOZZLE ESPECIALLY FOR HEATING BEVERAGES AND RISING FOAM THEREIN

DESCRIPTION

The present invention refers to a steam producing machine with an improved delivery nozzle especially for heating beverages such as coffee, cappuccino, milk, white coffee, chocolate or the like and for rising foam in same beverages.

BACKGROUND OF THE INVENTION

There are machines currently present on the market for making "espresso" coffee which are integrated, in the sense that the water supply necessary for preparing a number of beverages is contained inside said machines: many of these machines are provided with a delivery nozzle which allows both any liquid to be rapidly heated up and foam to be risen in coffee, milk, white coffee, chocolate and the like, by the admission of overheated steam.

The steam delivering nozzles of such machines are usually rather defective in the sense that the simplest types, consisting of simple pipes, are not able to produce dense and plentiful foam, while the most complex ones are more difficult to clean and are significantly more expensive.

In addition to this, the integrated coffee machines deal with rather large quantities of water, thus requiring some time for delivering the steam, and are quite cumbersome.

SUMMARY AND OBJECTS OF THE INVENTION

It is an object of the present invention to overcome the above mentioned drawback of the known machines, i.e. to provide an integrated machine capable of producing a dense and plentiful foam in beverages of any type and of rapidly achieving the conditions for the delivery of steam.

A further object of the present invention is to provide a machine which is of extremely fast cleaning and maintenance.

Within the scope of such object it is a task of the present invention to achieve the above mentioned goals by a simple structure, of relatively easy, practical accomplishment, of safe use and effective working as well as of comparatively low cost.

These objects are achieved by the present steam producing machine with an improved delivery nozzle, especially for heating beverages and rising foam therein, characterized in that it is made up of a water boiler with a sealing lid, at the bottom of which boiler a heating electrical resistance is combined, and which is provided at its top with an outlet for the steam intercepted by a manually operated valve and to which a delivery nozzle is fixed which is made up of a first tubular element which, in the outlet part, has a second tubular element coaxially mounted therein having its ends communicating with the atmosphere.

Further characteristics will be more clearly understood and evident from the detailed description of a preferred, but not exclusive, embodiment of a machine according to the invention, illustrated by way of a non limiting example in the attached drawing, in which:

BRIEF DESCRIPTION OF THE DRAWINGS

The only figure is a side view, partially sectioned on a diametral plane, of a steam producing machine with improved delivery nozzle according to the invention.

DESCRIPTION OF THE PREFERRED EMBODIMENT

With special reference to this figure, numeral 1 generally indicates the steam producing machine with an improved delivery nozzle 2 according to the invention.

The machine 1 comprises a metallic boiler 3 which has at its bottom a seat 4 for an electrical heating resistance element 5; the boiler is contained, with the interposition of an annular seal 6, within a frusto-conical casing 7, slightly diverging downwards, which has an inner support collar 8 on which an outer shoulder 3a of the boiler is made to rest.

Below the boiler there is housed a thermostatic switch 8 connected in series with the power supply for the resistance 5 and a protection thermostatic valve 10; numeral 11 indicates the screw for the grounding of the power cable.

A lid 14 made of poorly heat-conducting material, fixed by a screw 12 to a box-like body 13 holding the components of the apparatus, closes the base of the casing.

Outside its upper mouth, the boiler 3 has a threading 15 for the screwing of the inner threaded part 16 of a lid 17, which has an annular cavity for the fitting of a seal 18 made of (heat resistent) rubber or similar material, which by screwing the lid is tightened onto the mouth of the boiler.

In the boiler there is provided a threaded hole for the screwing of a safety pressure valve 19.

On the top of lid 17 a mount 20 is provided having a horizontal blind hole 21 which communicates with the vertical through hole 22; at its upper end the hole 22 has an enlargement 23 for the vertical slidingly mounting of the upper body 24 of a valve 25; the valve 25 comprises a stem which fits in place a seal 27 made of heat-resistant rubber or similar material; between the body 24 and the base of the enlargement 23 a small compression spring 28 is mounted which presses on seal 27 for tightly closing the lower mouth of hole 22.

Above the upper body 24 there is mounted a large push-button 29 whose lifting stroke is limited by the upper casing 30 of the lid which is suitably provided with vertical slots 31 which define the travel of teeth 32 of the push-button.

The pressing of push-button 29 downwards, according to arrow A, causes the opening of mouth 22 and the flow of steam through hole 21 in the direction of arrow B.

The duct 21 leads into a cylindrical housing 33 provided with a frusto-conical bottom for a dish 34 of deformable material which is fitted in place with an elastic ring; within the dish 34 a spherical housing 35 is formed for a spherical head 36 making up the end of nozzle 2; said spherical housing communicates with the slots 31 via an opening 35a.

The nozzle 2 consists of a first tubular element 37 which on one side is connected to the spherical head 36 and bends downwards forming an elbow 38: inside the first tubular element 37 and coaxially thereto there is welded a second tubular element 39 which extends on its lower end over a short length past the first tubular element 37 and on its upper end goes through elbow 38;

above the first tubular element 37 there is mounted a grip collar 40 made of poorly heat-conducing material: owing to the coupling of the spherical head, the nozzle can therefore be oriented in different fashions.

During its delivery, the steam from the boiler flows into the interspace which is defined between the first and the second tubular element 37 and 38: at the output of the steam, due to the high speed thereof, air is drawn through the second tubular element 39 and, accordingly, steam mixed with air comes out from the nozzle: this causes both an increase of the amount of gases blown into the liquid and a decrease of the temperature of same steam thereby generating a more plentiful and dense foam.

It should be noted that, owing to the reduced quantity of water inside the boiler, the apparatus according to the invention reaches rapidly the regime condition even if the heating resistance is of not too high a power.

As can be readily understood, the thermostatic switch 9 will break off the power supply to the resistance upon reaching of an operating temperature and will resume the supply again when the temperature will go too low.

Into the hole of element 39 an obstruction needle can be inserted from above: with the needle being fitted, the effect of the second tubular element 39 will be inhibited and the jet (of steam only) will result heated up and of reduced pressure; with the needle being fully withdrawn, the jet will be less heated and the volume of air will be of maximum value, while with the needle partially fitted, intermediate delivery conditions will be obtained.

Thus, the machine according to the invention will be able to supply either steam alone for the heating up of liquids, or steam enriched with air for rising foam in the same liquids.

It is thus clear how the invention achieves the proposed objects.

The invention is susceptible of several modifications and variations all falling within the inventive concept. Besides, all the details are replaceable by others technically equivalent.

I claim:

1. A steam producing machine with a delivery nozzle, especially for heating beverages and rising foam therein, comprising a water boiler with a sealing lid, said water boiler having a bottom with a heating electrical resistance element, said boiler being provided at its top with an outlet for steam intercepted by a manually operated valve and a delivery nozzle fixed to said outlet, said nozzle having a first tubular element which, in an outlet part, has a second tubular element coaxially mounted in said first tube tubular element and having its ends communicating with the atmosphere.

2. Machine according to claim 1, wherein said nozzle is fixed to said lid with variable inclination.

3. Machine according to claim 1, wherein said electrical resistance is connected in series to a thermostatic switch and that a connection is provided for a further safety thermostatic valve.

4. Machine according to claim 1, wherein said lid is able to be fitted to said boiler by screwing.

* * * * *